(12) United States Patent
Schmidt

(10) Patent No.: US 6,261,084 B1
(45) Date of Patent: Jul. 17, 2001

(54) ELASTICALLY DEFORMABLE NOZZLE FOR INJECTION MOLDING

(75) Inventor: Harald Schmidt, Georgetown (CA)

(73) Assignee: Synventive Moldings Solutions Canada, Inc., Georgetown (CA)

( * ) Notice: Subject to any disclaimer, the term of this patent is extended or adjusted under 35 U.S.C. 154(b) by 0 days.

(21) Appl. No.: 09/315,469

(22) Filed: May 20, 1999

Related U.S. Application Data

(60) Provisional application No. 60/098,327, filed on Aug. 28, 1998.

(51) Int. Cl.[7] .................................................. B29C 45/20
(52) U.S. Cl. .......................... 425/564; 425/566; 425/572
(58) Field of Search .................................. 425/549, 562, 425/563, 564, 565, 566, 572

(56) References Cited

U.S. PATENT DOCUMENTS

| 4,389,002 | 6/1983 | Devellian et al. . |
| 4,433,969 | * 2/1984 | Gellert ................................. 425/549 |
| 5,492,467 | 2/1996 | Hume et al. . |
| 5,545,028 | 8/1996 | Hume et al. . |
| 5,554,395 | 9/1996 | Hume et al. . |
| 5,674,439 | 10/1997 | Hume et al. . |
| 5,871,786 | 2/1999 | Hume et al. . |
| 5,885,628 | 3/1999 | Swenson et al. . |
| 5,894,025 | 4/1999 | Lee et al. . |
| 5,916,605 | 6/1999 | Swenson et al. . |
| 5,948,448 | 9/1999 | Schmidt . |
| 5,948,450 | 9/1999 | Swenson et al. . |

\* cited by examiner

Primary Examiner—Tim Heitbrink

(57) ABSTRACT

An injection molding machine is provided that includes a manifold for distributing plastic melt flow to one or more mold cavities. The manifold has a flow channel having an output orifice surrounded by a lower outside surface, and is expandable upon heating. The injection molding machine also includes a nozzle comprising a body mounted in a receiving aperture in a stationary housing aligned with a gate to a mold cavity, the body having a central bore for delivering plastic melt flow from the channel in the manifold to the mold cavity, the body having an upper surface for engaging with the lower surface of the manifold. The body has a lip member comprising an outer leg circumferentially spaced from an inner body section of the body, the outer leg having a surface mounted against a mounting surface of a stationary housing. The manifold is mounted adjacent to the stationary housing and the nozzle is mounted in or on the stationary housing such that the upper surface of the body of the nozzle faces the lower surface of the manifold for engagement therewith. The lower surface of the manifold engages the upper surface of the body of the nozzle under compression, the outer leg of the lip member being compressed by the compression between the engaged upper surface of the body and the lower surface of the manifold.

18 Claims, 5 Drawing Sheets

ELASTICALLY DEFORMABLE NOZZLE FOR INJECTION MOLDING

This application claims priority under 35 USC § 119 (e) to commonly-owned, co-pending U.S. provisional patent application Ser. No. 60/098,327 entitled "Elastically Deformable Nozzle for Injection Molding", filed Aug. 28, 1998, by Harald Schmidt, which is incorporated herein by reference in its entirety.

BACKGROUND

The present invention relates generally to injection molding machines and processes and, more particularly, to nozzle apparati and methods for mounting nozzles in sealable alignment with the gate(s) to mold cavity(ies). Injection molding machines may utilize heated manifolds or hot runners to distribute the flow of molten plastic to one or more nozzles. The flow path communication between the hot runners and the nozzle and between the end of the nozzle and the gate to the mold cavity is preferably tightly sealed via compressed contact between the mating surfaces of the hot runner/nozzle and nozzle/gate in order to prevent leakage of plastic, gases and the like which are flowing through the hot runner and nozzle under high pressure. Where a single hot runner or manifold is used to deliver plastic flow to more than one nozzle, the mating surfaces of the hot runner and the nozzles and the mounting of the nozzles must be precisely machined/designed in order to provide the desired compression contact for each individual nozzle particularly where the individual components, such as the manifold, nozzle and associated component(s) (e.g. the mold housing itself or a retainer plate which may be mounted on the mold) expand when heated from their cold (room temperature) state to their machine operating state. As can be readily imagined, it can be difficult and expensive to manufacture a manifold, nozzle and mounting housing(s) which highly precisely effect the desired amount of compression and alignment between the manifold/nozzle and nozzle/gate surfaces at the elevated operating temperature of the machine.

SUMMARY OF THE INVENTION

In accordance with the invention there is provided, in an injection molding machine having a manifold for distributing plastic melt flow to one or more mold cavities, wherein the manifold has a flow channel having an output orifice surrounded by a lower outside surface, the manifold being expandable upon heating, a nozzle comprising:

a body mounted in a receiving aperture in a stationary housing aligned with a gate to a mold cavity, the body having a central bore for delivering plastic melt flow from the channel in the manifold to the mold cavity, the body having an upper surface for engaging with the lower surface of the manifold;

wherein the body has a lip member comprising an outer leg circumferentially spaced from an inner body section of the body, the outer leg having a surface mounted against a mounting surface of a stationary housing;

wherein the manifold is mounted adjacent to the stationary housing, the nozzle being mounted in or on the stationary housing such that the upper surface of the body of the nozzle faces the lower surface of the manifold for engagement therewith;

the lower surface of the manifold engaging the upper surface of the body of the nozzle under compression;

the outer leg of the lip member being compressed by the compression between the engaged upper surface of the body and the lower surface of the manifold.

The body of the nozzle preferably has a lower body surface engaging a surface on the interior of the receiving aperture surrounding the gate under compression from at least the compression between the engaged upper surface of the body and the lower surface of the manifold.

Further in accordance with the invention, there is provided in an injection molding machine having a manifold for distributing plastic melt flow to one or more mold cavities, wherein the manifold has a flow channel having an output orifice surrounded by a lower outside surface, the manifold being expandable upon heating, a nozzle comprising:

a body mounted in a receiving aperture in a stationary housing aligned with a gate to a mold cavity, the body having a central bore for delivering plastic melt flow from the channel in the manifold to the mold cavity, the body having an upper surface for engaging with the lower surface of the manifold;

wherein the body has a lip member comprising an outer downwardly extending leg connected through a radially extending leg section to an inner body section of the body, the outer leg having a surface mounted against a mounting surface of a stationary housing;

wherein the manifold is mounted adjacent to the stationary housing, the nozzle being mounted in or on the stationary housing such that the upper surface of the body of the nozzle faces the lower surface of the manifold for engagement therewith;

the lower surface of the manifold engaging the upper surface of the body of the nozzle under compression;

the outer leg of the lip member being compressed by the compression between the engaged upper surface of the body and the lower surface of the manifold.

Further in accordance with the invention, there is provided in an injection molding machine having a manifold for distributing plastic melt flow to one or more mold cavities, wherein the manifold has a lower surface, the manifold being expandable upon heating, a nozzle mounted in a receiving aperture of a stationary housing aligned with a gate of a mold cavity, the nozzle comprising:

an inner body having a central bore for delivering plastic melt flow from a channel in the manifold to the mold cavity, the inner body having an upper surface for engaging with the lower surface of the manifold;

an outer body having a central bore within which the inner body is mounted, wherein the outer body has a lip member comprising an outer leg and an inner leg, the outer leg having a surface mounted against a mounting surface of the stationary housing, the inner body having a lower surface mounted against a mounting surface of the inner leg;

wherein the manifold is mounted adjacent to the stationary housing, the nozzle being mounted in the receiving aperture such that the upper surface of the inner body of the nozzle faces the lower surface of the manifold for engagement therewith;

the lower surface of the manifold engaging the upper surface of the inner body of the nozzle under compression;

the outer leg of the lip member being compressed by the compression between the engaged upper surface of the inner body and the lower surface of the manifold.

The mounting surface for the inner leg is preferably disposed on a protrusion from the inner leg protruding radially toward the central bore. The lip member typically comprises a hollow cylinder having an elongated flange member extending circumferentially around an outside surface of the cylinder, wherein the flange member comprises the outer leg and at least a portion of the cylinder comprises the inner leg. The manifold and the stationary housing are preferably fixedly mounted relative to each other and the nozzle is mounted in the receiving aperture within the stationary housing wherein the central bore of the inner body is aligned with the channel of the manifold. Preferably, the inner leg of the lip member is stretched and the outer leg of the lip member is compressed by the compression between the engaged upper surface of the inner body and the lower surface of the manifold.

At least one of the inner and outer bodies preferably has a lower body surface engaging a surface on the interior of the receiving aperture surrounding the gate under compression from at least the compression between the engaged upper surface of the inner body and the lower surface of the manifold. A sealed space is preferably disposed between the inner body and the outer body.

Further in accordance with the invention there is provided, in an injection molding machine having a manifold for distributing plastic melt flow to one or more mold cavities, wherein the manifold has a lower surface, the manifold being expandable upon heating, a nozzle mounted in a receiving aperture of a stationary housing aligned with a gate of a mold cavity, the nozzle comprising:

an inner body having a central bore for delivering plastic melt flow from a channel in the manifold to the mold cavity, the inner body having an upper surface for engaging with the lower surface of the manifold;

an outer body having a central bore within which the inner body is mounted, wherein the outer body has a lip member comprising a downwardly extending outer leg connected through a radially extending leg section to a main body member of the outer body, the outer leg having a surface mounted against a mounting surface of the stationary housing, the inner body having a lower surface mounted against a mounting surface of the main body member;

wherein the manifold is mounted adjacent to the stationary housing, the nozzle being mounted in the receiving aperture such that the upper surface of the upper body of the nozzle faces the lower surface of the manifold for engagement therewith;

the lower surface of the manifold engaging the upper surface of the inner body of the nozzle under compression;

the outer leg of the lip member being compressed by the compression between the engaged upper surface of the inner body and the lower surface of the manifold.

BRIEF DESCRIPTION OF THE DRAWINGS

The invention is described with reference to the following drawings which illustrate examples or embodiments of the invention, wherein.

DETAILED DESCRIPTION

Figure 1:
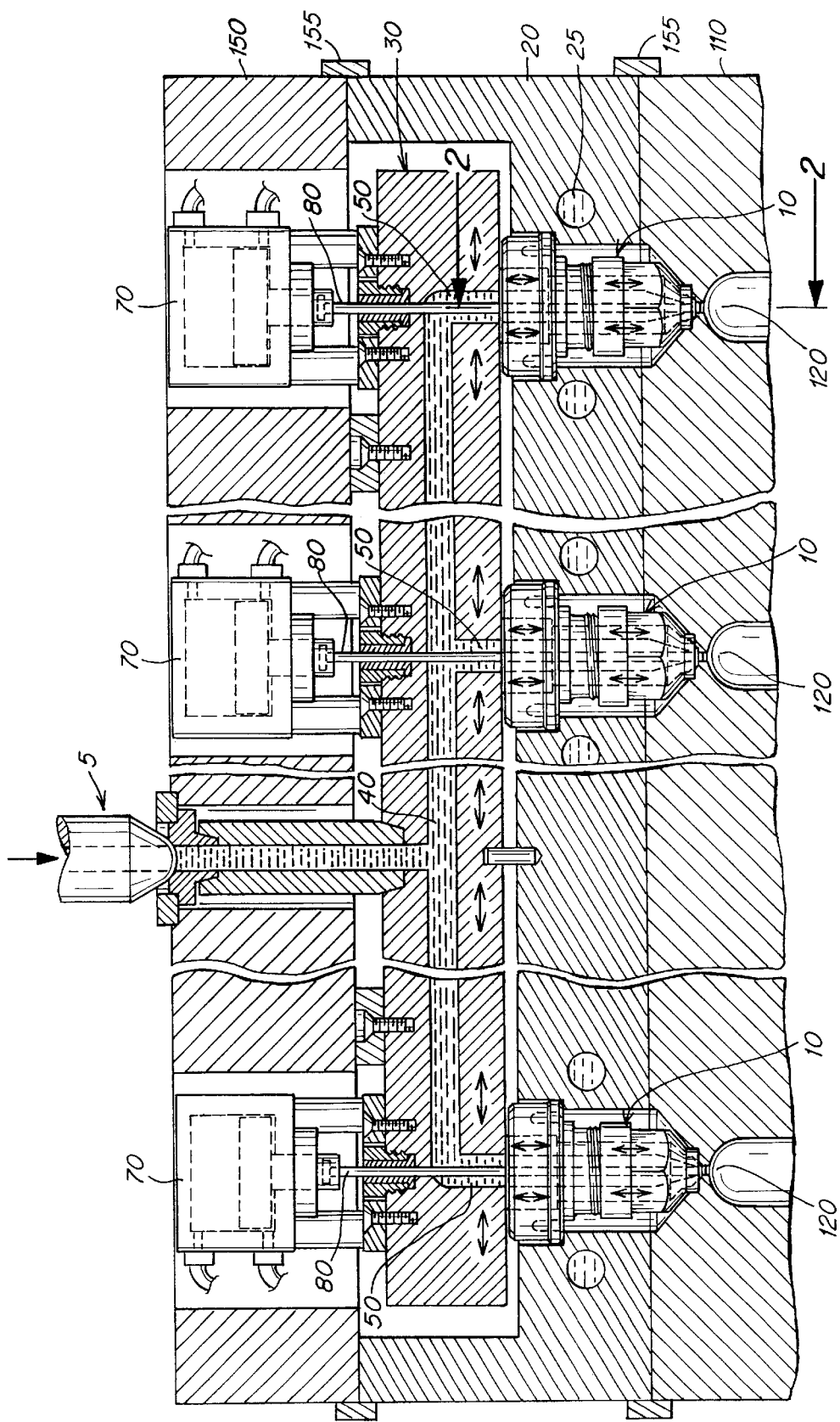
FIG. 1 is a partial cross-sectional schematic view of an injection mold showing the relative functional relationship of an injection nozzle 5 to a manifold and plurality of hot runner nozzles.

FIG. 1 shows a plurality of nozzle mechanisms 10 according to the invention mounted in a retaining plate 20 beneath a heated manifold or hot runner 30. Molten fluid, typically plastic, is injected, under high pressure, e.g. 10,000–40,000 psi, into a distribution channel 40 which has a plurality of output ports 50 which are aligned with the input apertures 60, FIG. 2, of the nozzles 10. Actuators 70 which are preferably programmably controllable, are provided for controlling reciprocal motion of valve pins 80 which operate to control the flow of plastic material through the output ends 90, FIG. 3, of nozzles 10 and through the gates 100, FIGS. 3, 4, of a mold 110 and ultimately into the various cavities 120 of the mold 110.

Figure 2:
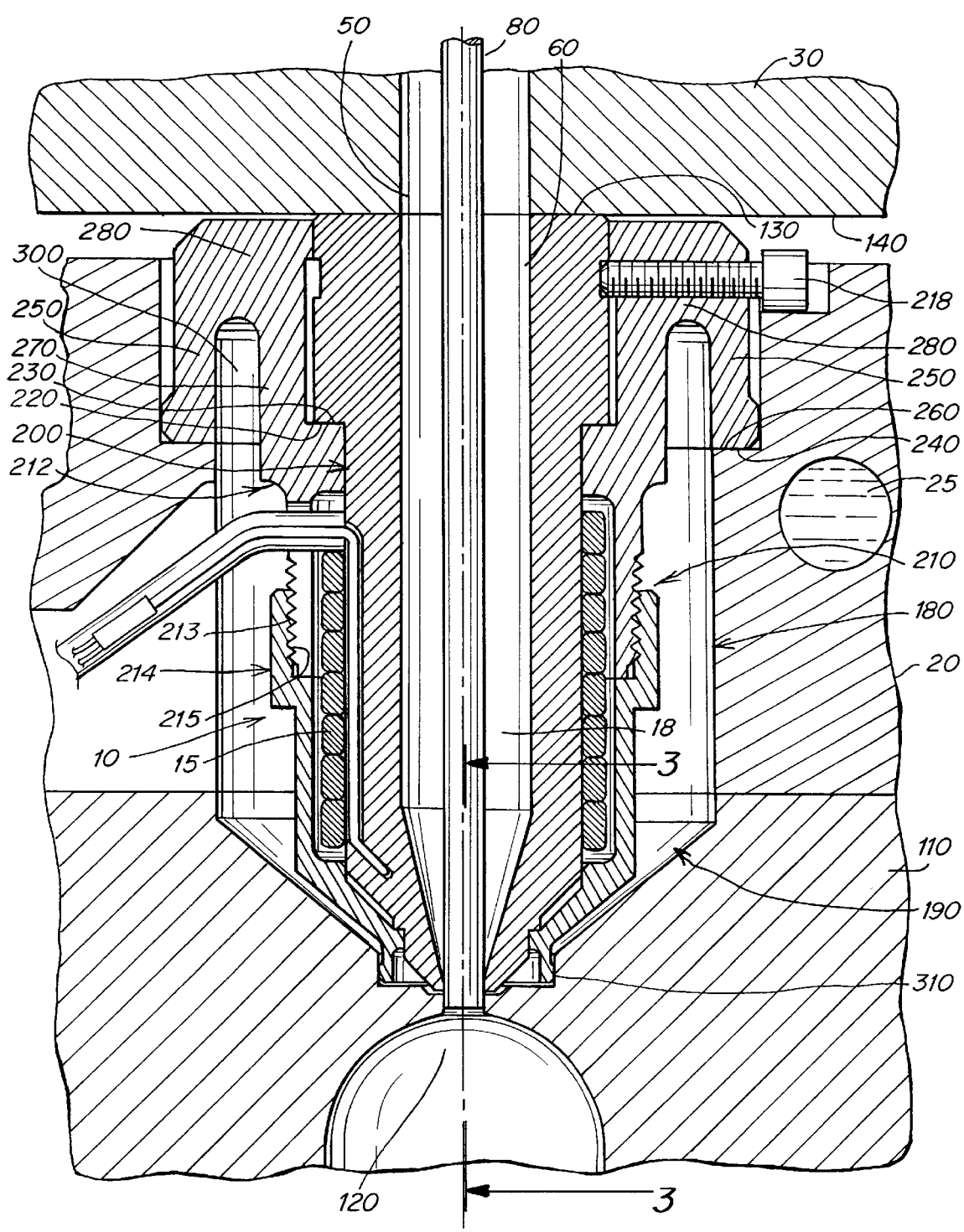
FIG. 2 is a side cross-sectional view of a nozzle apparatus according to the invention showing the nozzle mounted together in assembly with a fluid distributing manifold, a mounting or retaining plate and a mold.
Figure 3:
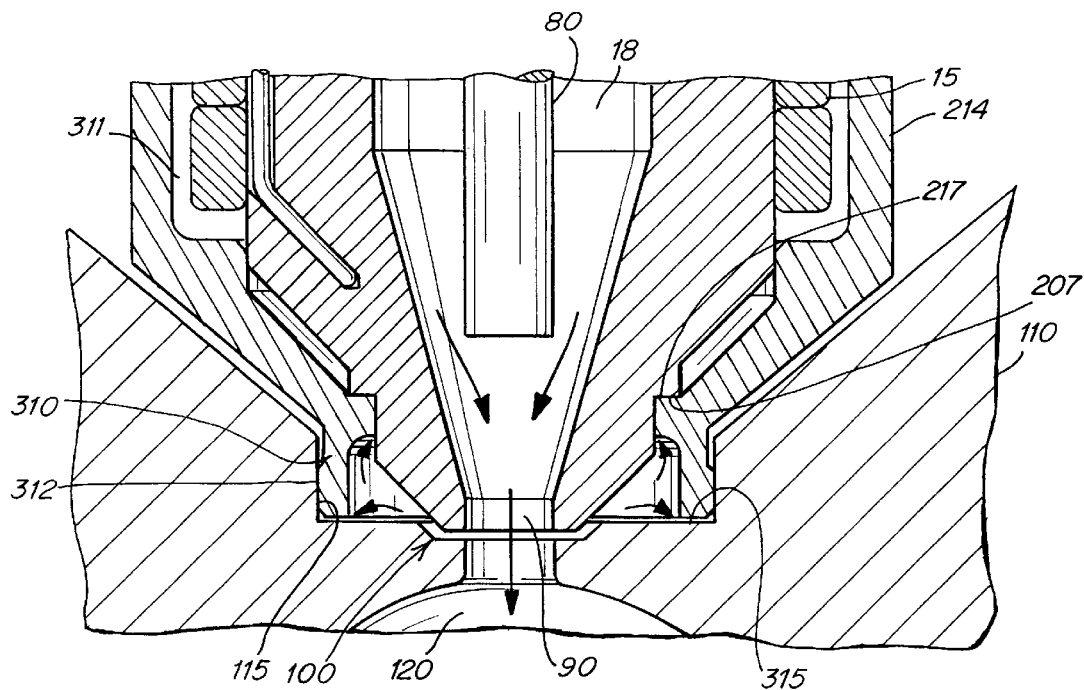
FIG. 3 is a more detailed side, cross-sectional view of the output end of the FIG. 2 apparatus.

As shown in FIGS. 1, 2, the undersurface 140 of the manifold 30 is seated or positioned on the top of the highest projecting surface(s) 130 of the nozzle mechanisms 10. The various retaining, mounting or housing components, e.g., plates 20,150, manifold 30 and mold 110 are rigidly interconnected to each other in a cold, e.g. room temperature, state via conventional mechanisms, e.g. bolts, clasps or the like 155, or the manifold 30 is sandwiched between such components 150, 20 such that when mounted and assembled in a cold state, the manifold 30, nozzles 10, plate 20 and mold housing 110 are firmly stationary relative to each other. As discussed below, upon heating of the various components during operation of the machine, the heated components will expand to various degrees depending upon the thicknesses, lengths widths, compositions and degree to which such components are heated. Heating elements, such as cooling lines 25 and coils 15, FIGS. 1, 2, are typically provided for effecting controlled heating and/or cooling (e.g. of the mold) of the various components. Although not shown in the figures, the manifold 30 is typically controllably heated in injection molding processes.

Figure 4:
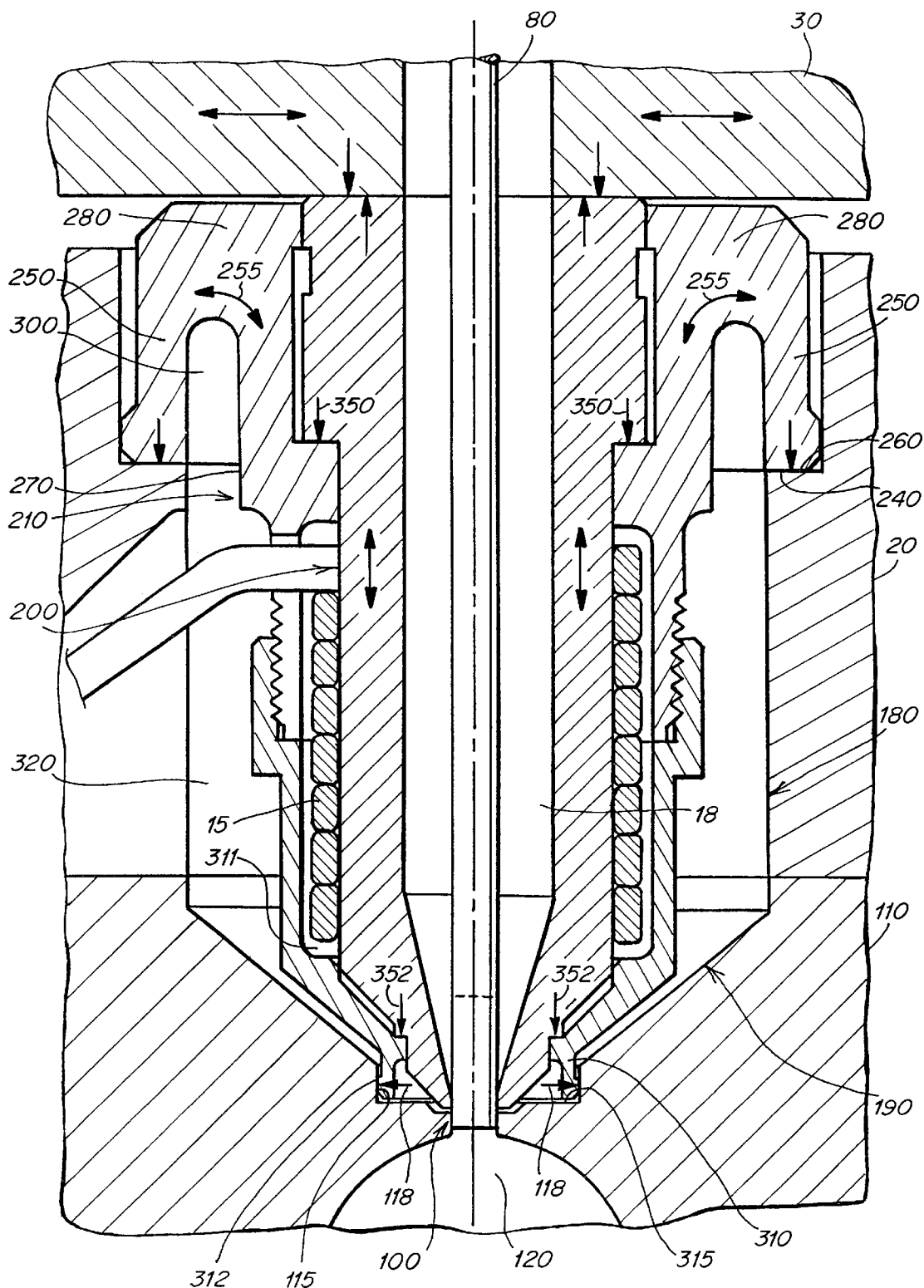
FIG. 4 is another view of FIG. 2 showing lines which indicate various expansion, stress and compression forces which occur in the described system when a nozzle according to the invention is assembled together with appropriate manifold and mounting components; and, FIG. 5 is an isometric exploded view of the nozzle mechanism shown in FIGS. 2, 4.

As shown in FIGS. 1, 2, 4, the nozzles 10 are mounted in apertures 180, 190 which are selectively provided in the retaining plate 20 and/or mold housing 110 so as to align the nozzle exit(s) 90 and the bore(s) 18 of the nozzle with the aperture of the gate(s) 100 which leads into the cavity.

In the embodiments shown in the Figures, the nozzles 10 comprise an inner body 200 seated within an outer body 210 via seating of a downwardly facing surface 220 of a flange-like extension on an upwardly facing surface 230 of the inner nozzle body on another flange-like extension of the outer nozzle body, FIG. 2. The outer body 210, FIGS. 2, 4, of the nozzle is seated within the alignment aperture 180 via the seating of a downwardly facing surface 240 of an outer leg 250 on an upwardly facing mounting surface 260 of plate 20, FIG. 2. As shown, the outer body 210, FIGS. 2, 4, comprises the outer leg 250 which is interconnected to a main cylindrical body 270 through a generally radially disposed or oriented arm 280. The main cylindrical body 270 itself comprises an inner leg which is separated from the outer leg 250 by a space 300.

As best shown in FIGS. 2, 4, the undersurface 140 of the manifold 30 faces the upwardly facing top surface 130 of the inner body 200 of the nozzles(s) 10 for purposes of making compressive contact therewith. Initially upon assembly, the manifold undersurface 140 is typically placed in contact with the top surfaces 130 of each of the plurality of nozzles 10, FIG. 1, which are mounted in the plate 20 for use in an injection molding cycle. Due to variations in machining tolerances of the nozzle components, mounting plate(s) 20, mold 30 and/or mold housing 110, the top surfaces 130 of every nozzle 10 may not necessarily make the same or uniform contact with the mold undersurface 140.

Notwithstanding variations in machining, the manifold 30 and various nozzle components and mounting plates can be readily manufactured so as to ensure compressive contact between the manifold undersurface 140 and nozzle upper surface 130 when the various components are heated and expand at typical operating temperatures, e.g. 100–300° Centigrade.

Figure 3A:
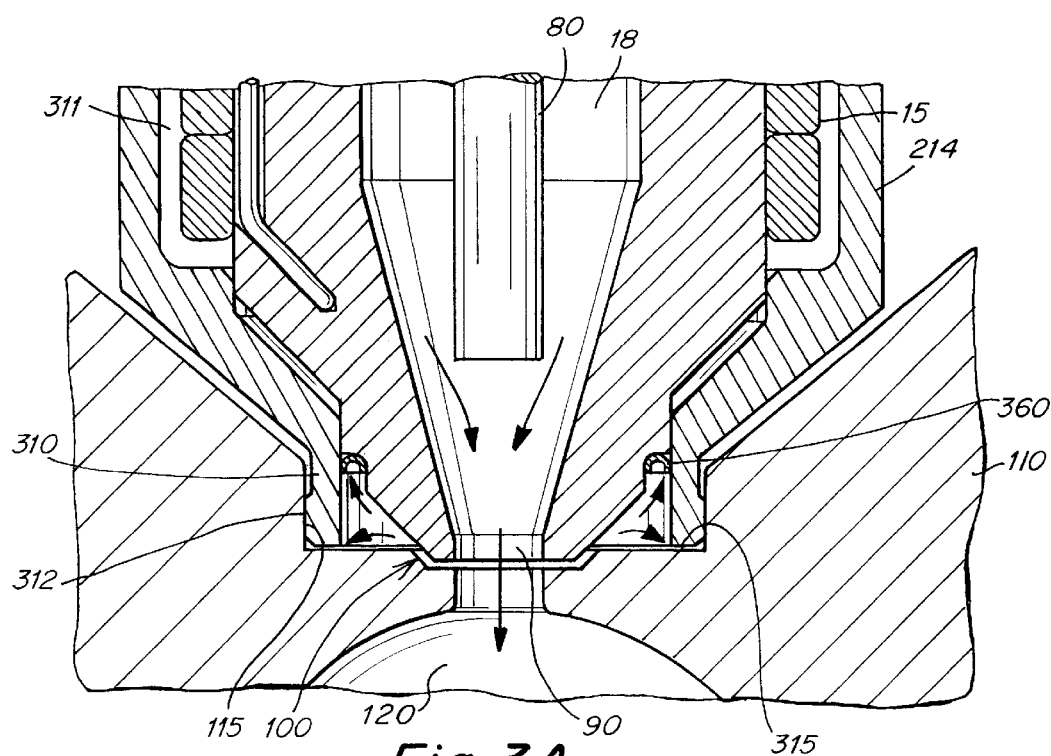
FIG. 3A is a variation of the FIG. 3 apparatus showing the use of an O-ring at the output end of the nozzle.
Figure 5:
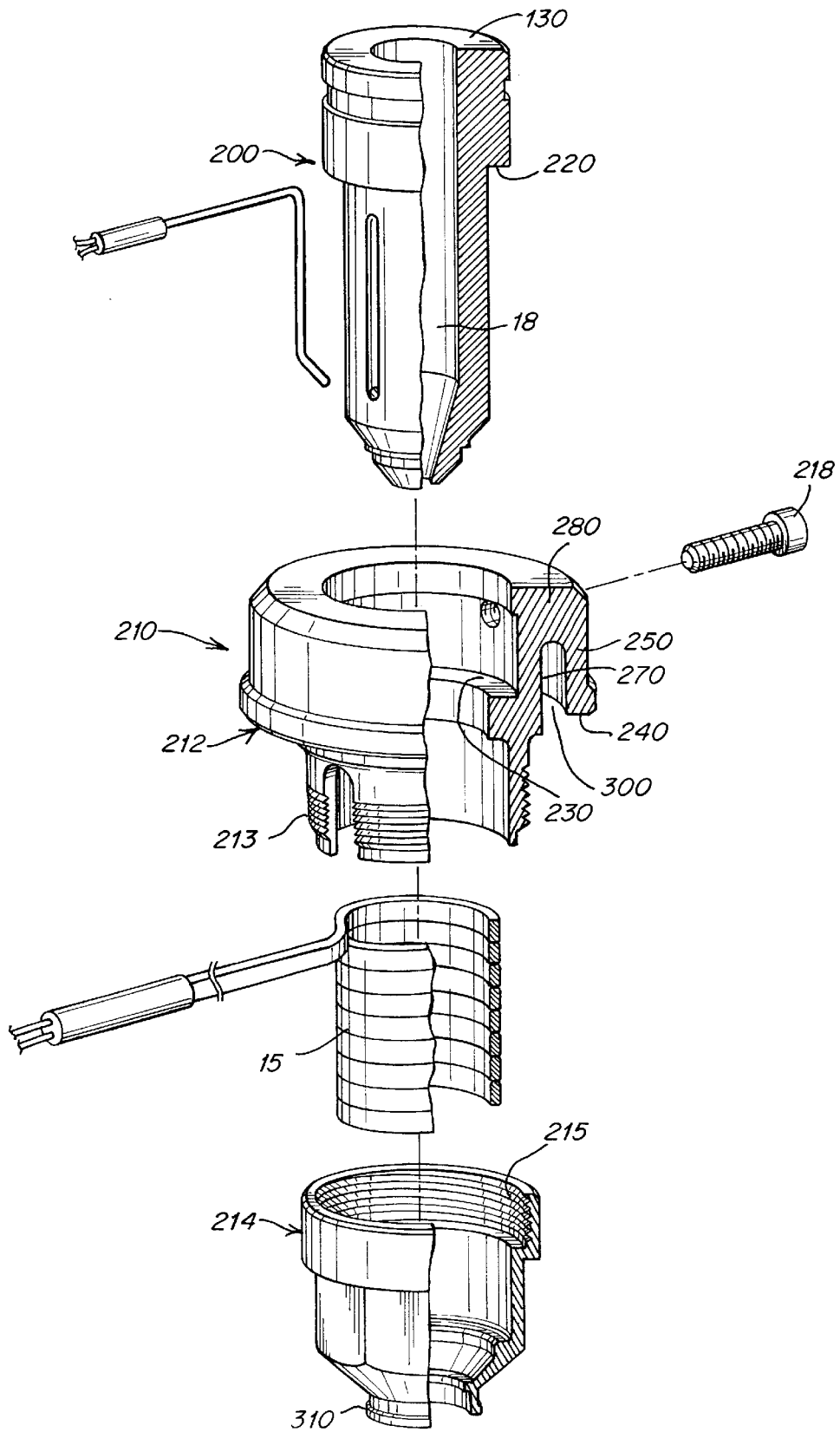

In the embodiments shown, the outer body 210 of the nozzle(s) 10 comprises two pieces 212, 214 (best shown in FIG. 5) interconnected via threads 213, 215. The output end 90 of the nozzle 10 is preferably axially aligned with the gate 100 via end extensions 310 which seat within a complementary aperture provided in the mold housing 110 surrounding the gate 100, FIGS. 3, 3A. As can be readily imagined, the outer bodies 210 could be constructed as a single or unitary piece/component; and, as can also be readily imagined, the inner body 200 and outer body 210 could together be constructed as a unitary piece/component. In the embodiments shown, the inner body 200 may be stationarily secured within outer body 210 via a set screw 218.

In the embodiment shown in the Figures, the two piece, inner body 200, outer body 210 design enables the ready mounting of heater coils 15 within a space 311 which is sealed against inward leakage of plastic or gases upon heating and operation of the apparatus. An insulative air space 320 surrounding the entire nozzle 10 also results from the preferred embodiment(s) shown in the Figures.

In operation, at least the manifold 30 and other heated components (such as the nozzle body 200) expand at least to such a degree that the undersurface 140 of the manifold 30 bears down on the nozzle bodies 200 which in turn causes the outer legs 250 to be compressed, the inner legs 270 to be stretched and the radially disposed sections 280 to twist 255 under stress. Simultaneously, downward force 350, 352, FIG. 4, 280 is exerted on the end extensions 310 which causes the tip ends of extensions 310 to form a seal with the mold surfaces 315 surrounding the gate 100 such that plastic melt, gases and the like are prevented from leaking into space 320. The downward force 350, 352 further causes compression between lateral surface 312 of the extensions 310 and lateral surface 115 of the mold housing surrounding the gate 100 area. Downward force 352, FIG. 4, also causes sealed contact between the lower surface 207 of the lower lip element of body 200 (best shown in FIG. 3) and the upper surface 217 of the lower ledge element of outer body component 214 such that leakage of plastic into space 311 is also prevented. In the embodiment shown in FIG. 3A, an O-ring 360 is employed to prevent leakage into space 311.

As shown in the Figures, the combination of leg elements 250, 270 and 280 form a generally U-shaped circumferential mounting lip. The precise configuration of such components may be varied such that the effective function of compression of the outer member 250 and twisting 255 of the radial member 280 is achieved to enable a greater range of manufacturing tolerance in construction and assembly of the manifold 30 and nozzles 10 and surfaces around the gate 100.

Having thus described certain embodiments of the present invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting.

What is claimed:

1. In an injection molding machine having a manifold for distributing plastic melt flow to one or more mold cavities, wherein the manifold has a flow channel having an output orifice surrounded by a lower outside surface, the manifold being expandable upon heating, a nozzle comprising:

a body mounted in a receiving aperture in a stationary housing aligned with a gate to a mold cavity, the body having a central bore for delivering plastic melt flow from the channel in the manifold to the mold cavity, the body having an upper surface for engaging with the lower surface of the manifold;

wherein the body has a lip member comprising an outer leg circumferentially spaced from an inner body section of the body and a radially extending arm connecting the outer leg to an inner body section of the body, the outer leg having a surface mounted against a mounting surface of a stationary housing;

wherein the manifold is mounted adjacent to the stationary housing, the nozzle being mounted in or on the stationary housing such that the upper surface of the body of the nozzle faces the lower surface of the manifold for engagement therewith;

the lower surface of the manifold engaging the upper surface of the body of the nozzle under compression;

the outer leg of the lip member being compressed by the compression between the engaged upper surface of the body and the lower surface of the manifold and the radially extending arm being twisted by the compression.

2. The injection molding machine of claim 1 wherein the body has a lower body surface engaging a surface on the interior of the receiving aperture surrounding the gate under compression from at least the compression between the engaged upper surface of the body and the lower surface of the manifold.

3. In an injection molding machine having a manifold for distributing plastic melt flow to one or more mold cavities, wherein the manifold has a flow channel having an output orifice surrounded by a lower outside surface, the manifold being expandable upon heating, a nozzle comprising:

a body mounted in a receiving aperture in a stationary housing aligned with a gate to a mold cavity, the body having a central bore for delivering plastic melt flow from the channel in the manifold to the mold cavity, the body having an upper surface for engaging with the lower surface of the manifold;

wherein the body has a lip member comprising an outer downwardly extending leg connected through a radially extending leg section to an inner body section of the body, the outer leg having a surface mounted against a mounting surface of a stationary housing;

wherein the manifold is mounted adjacent to the stationary housing, the nozzle being mounted in or on the stationary housing such that the upper surface of the body of the nozzle faces the lower surface of the manifold for engagement therewith;

the lower surface of the manifold engaging the upper surface of the body of the nozzle under compression;

the outer leg of the lip member being compressed by the compression between the engaged upper surface of the body and the lower surface of the manifold and the radially extending leg section being twisted by the compression between the engaged upper surface of the body and the lower surface of the manifold.

4. The injection molding machine of claim 3 wherein the body has a lower body surface engaging a surface on the interior of the receiving aperture surrounding the gate under compression from at least the compression between the engaged upper surface of the body and the lower surface of the manifold.

5. In an injection molding machine having a manifold for distributing plastic melt flow to one or more mold cavities, wherein the manifold has a lower surface, the manifold being expandable upon heating, a nozzle mounted in a receiving aperture of a stationary housing aligned with a gate of a mold cavity, the nozzle comprising:

an inner body having a central bore for delivering plastic melt flow from a channel in the manifold to the mold cavity, the inner body having an upper surface for engaging with the lower surface of the manifold;

an outer body having a central bore within which the inner body is mounted, wherein the outer body has a lip member comprising an outer leg and an inner leg and a radially extending arm interconnecting the outer and inner legs, the outer leg having a surface mounted against a mounting surface of the stationary housing, the inner body having a lower surface mounted against a mounting surface of the inner leg;

wherein the manifold is mounted adjacent to the stationary housing, the nozzle being mounted in the receiving aperture such that the upper surface of the inner body of the nozzle faces the lower surface of the manifold for engagement therewith;

the lower surface of the manifold engaging the upper surface of the inner body of the nozzle under compression;

the outer leg of the lip member being compressed by the compression between the engaged upper surface of the inner body and the lower surface of the manifold.

6. The injection molding machine of claim 5 wherein the mounting surface of the inner leg is disposed on a protrusion from the inner leg protruding radially toward the central bore.

7. The injection molding machine of claim 5 wherein the lip member comprises a hollow cylinder having an elongated flange member extending circumferentially around an outside surface of the cylinder, wherein the flange member comprises the outer leg and at least a portion of the cylinder comprises the inner leg.

8. The injection molding machine of claim 5 wherein the manifold and the stationary housing are fixedly mounted relative to each other and the nozzle is mounted in the receiving aperture within the stationary housing wherein the central bore of the inner body is aligned with the channel of the manifold.

9. The injection molding machine of claim 5 wherein the inner leg of the lip member is stretched and the outer leg of the lip member is compressed by the compression between the engaged upper surface of the inner body and the lower surface of the manifold.

10. The injection molding machine of claim 5 wherein at least one of the inner and outer bodies has a lower body surface engaging a surface on the interior of the receiving aperture surrounding the gate under compression from at least the compression between the engaged upper surface of the inner body and the lower surface of the manifold.

11. The injection molding machine of claim 5 wherein a sealed space is disposed between the inner body and the outer body.

12. In an injection molding machine having a manifold for distributing plastic melt flow to one or more mold cavities, wherein the manifold has a lower surface, the manifold being expandable upon heating, a nozzle mounted in a receiving aperture of a stationary housing aligned with a gate of a mold cavity, the nozzle comprising:

an inner body having a central bore for delivering plastic melt flow from a channel in the manifold to the mold cavity, the inner body having an upper surface for engaging with the lower surface of the manifold;

an outer body having a central bore within which the inner body is mounted, wherein the outer body has a lip member comprising a downwardly extending outer leg connected through a radially extending leg section to a main body member of the outer body, the outer leg having a surface mounted against a mounting surface of the stationary housing, the inner body having a lower surface mounted against a mounting surface of the main body member;

wherein the manifold is mounted adjacent to the stationary housing, the nozzle being mounted in the receiving aperture such that the upper surface of the upper body of the nozzle faces the lower surface of the manifold for engagement therewith;

the lower surface of the manifold engaging the upper surface of the inner body of the nozzle under compression;

the outer leg of the lip member being compressed by the compression between the engaged upper surface of the inner body and the lower surface of the manifold and the radially extending leg section being twisted by the compression.

13. The injection molding machine of claim 12 wherein the mounting surface of the main body member is disposed on a protrusion from the main body member protruding radially toward the central bore.

14. The injection molding machine of claim 12 wherein the lip member comprises a hollow cylinder having an elongated flange member extending circumferentially around an outside surface of the cylinder, wherein the flange member comprises the outer leg and at least a portion of the cylinder comprises the main body member.

15. The injection molding machine of claim 12 wherein the manifold and the stationary housing are fixedly mounted relative to each other and the nozzle is mounted in the receiving aperture within the stationary housing wherein the central bore of the inner body is aligned with the channel of the manifold.

16. The injection molding machine of claim 12 wherein the main body member of the lip member is stretched and the outer leg of the lip member is compressed by the compression between the engaged upper surface of the inner body and the lower surface of the manifold.

17. The injection molding machine of claim 12 wherein at least one of the inner and outer bodies has a lower body surface engaging a surface on the interior of the receiving aperture surrounding the gate under compression from at least the compression between the engaged upper surface of the inner body and the lower surface of the manifold.

18. The injection molding machine of claim 12 wherein a sealed space is disposed between the inner body and the outer body.

* * * * *